United States Patent [19]

Dyer

[11] Patent Number: 4,680,241
[45] Date of Patent: Jul. 14, 1987

[54] METHOD FOR RESTORING THE LOST CAPACITY OF NICKEL BATTERIES AND BATTERIES FORMED THEREBY

[75] Inventor: Christopher K. Dyer, Summit, N.J.

[73] Assignee: American Telephone and Telegraph Company, AT&T Bell Laboratories, Murray Hill, N.J.

[21] Appl. No.: 705,050

[22] Filed: Feb. 25, 1985

Related U.S. Application Data

[63] Continuation-in-part of Ser. No. 556,138, Nov. 29, 1983, abandoned.

[51] Int. Cl.$^4$ .................. H01M 10/44; H02J 7/06
[52] U.S. Cl. ........................... 429/49; 429/50; 429/52; 320/14; 320/21; 320/35
[58] Field of Search ............. 320/14, 21, 35; 429/49, 429/50, 52, 223

[56] References Cited

U.S. PATENT DOCUMENTS 3,917,990  11/1975  Sherman ........................ 320/35
3,959,706  5/1976  Mabuchi et al. ................ 320/35 X
4,237,411  12/1980  Kothe et al. ..................... 320/35 X Primary Examiner—Brian E. Hearn
Assistant Examiner—Stephen J. Kalafut
Attorney, Agent, or Firm—Bernard Tiegerman

[57] ABSTRACT

A method for partially or fully restoring the lost capacities of nickel batteries, as well as the batteries produced by this method, is disclosed.

In accordance with the inventive method, a nickel battery is cycled at least 10 times, with each cycle including a discharging step during which the capacity achieved at the end of the previous cycle is reduced by at least 5 percent, and a charging step. The charging rate employed during the charging step is greater than about C/10 per hour. Moreover, while the ratio of the amount of charge delivered to the battery during the charging step of each cycle to the amount of charge withdrawn from the battery during the previous cycle is greater than one, this ratio is chosen so that the temperature of the electrolyte of the battery does not exceed about 30 degrees Centigrade.

10 Claims, 1 Drawing Figure

METHOD FOR RESTORING THE LOST CAPACITY OF NICKEL BATTERIES AND BATTERIES FORMED THEREBY

This is a continuation-in-part of U.S. patent application Ser. No. 556,138, filed by Christopher K. Dyer on Nov. 28, 1983 now abandoned.

BACKGROUND OF THE INVENTION

1. Field of the Invention

The invention pertains to nickel batteries.

2. Art Background

A nickel battery (for purposes of the invention) is a battery which includes a cell (or cells) where the electrochemically active material at the positive electrode of the cell contains nickel hydroxide ($Ni(OH)_2$). (Electrochemically active material is material which stores and releases electrical charge when a constituent of the material electrochemically undergoes, respectively, a valency increase and a valency decrease.) During charging, the $Ni(OH)_2$ is oxidized to form $NiOOH$ (with the valency of Ni increasing from 2 to 3), while during discharging, the $NiOOH$ is converted to $Ni(OH)_2$.

Included among the different types of nickel batteries are, for example, nickel-hydrogen (Ni-$H_2$), nickel-cadmium (Ni-Cd), nickel-zinc (Ni-Zn), and nickel-iron (Ni-Fe) batteries. In a Ni-$H_2$ battery, hydrogen ($H_2$) gas is evolved at the negative electrode of the cell during charging. In a Ni-Cd, Ni-Zn, or Ni-Fe battery, the negative electrode includes Cd, Zn, or Fe, respectively (hence the nomenclature), when the battery is charged.

Nickel batteries have a number of advantageous properties including the fact that they are rechargeable (they can be charged and discharged more than 200 times) and have relatively high energy densities (stored charge per unit weight or per unit volume) compared, for example, to lead-acid batteries. In addition, nickel batteries are relatively inexpensive compared to noble metal batteries (which also exhibit high energy densities) such as silver-zinc (Ag-Zn) or silver-cadmium (Ag-Cd) batteries. These advantageous properties have resulted in nickel batteries being widely used in, for example, earth-orbiting satellites, toys, and battery powered shavers.

Shortly after manufacture, a nickel battery generally undergoes a characterization procedure to determine the capacity of the battery (the maximum amount of charge, typically expressed in Ampere-hours, which the battery will deliver during discharging). During this characterization procedure, the battery (which is initially discharged) is successively charged and discharged, usually 3 or 4 times. The first charging step generally produces a relatively large capacity increase, with each successive charging step (interrupted by intervening discharging steps) producing successively smaller increments in capacity. After the third or fourth charging step, no further increase in capacity is usually achieved. If the battery is defect-free, then the maximum capacity achieved using this characterization procedure will be equal, or approximately equal, to the theoretical capacity, C (the amount of charge which the battery is theoretically capable of storing if all of the $Ni(OH)_2$ is converted to $NiOOH$), of the battery. (Theoretical capacities of individual nickel battery cells used, for example, in earth-orbiting satellites are typically about 25 Ampere-hours.)

A significant problem associated with both used and unused (new) nickel batteries is that they suffer a substantial (as much as 50-60 percent) loss of capacity when stored for relatively long periods of time (a month or more) at room temperature, or when stored for relatively short periods of time (a week or less) at temperatures higher than room temperature. (Batteries are normally stored discharged and shorted, i.e., the battery terminals are electrically connected to one another, to prevent sparking and the possibility of fires.) That is, when nickel batteries are removed from storage and subjected to the usual characterization procedure, the measured capacities are substantially lower than their theoretical capacities (if, for example, C=25 Ampere-hours, then the measured capacities are typically 15 Ampere-hours). (During the characterization procedure, the first charging step produces a jump in capacity up to about 13 or 14 Ampere-hours, the second charging step produces a further capacity increase of about 0.5 Ampere-hours, and each successive charging step produces rapidly decreasing increments in capacity.) This problem of capacity loss is particularly prevalent in nickel batteries where the $Ni(OH)_2$ is electrochemically deposited (regarding electrochemical deposition of $Ni(OH)_2$ see, e.g., U.S. Pat. No. 3,653,967 issued to R. L. Beauchamp on Apr. 14, 1972).

Attempts to restore the lost capacities (lost during storage) of nickel batteries, i.e., to increase capacities beyond the levels achieved with the usual characterization procedures, have involved continuously charging the batteries at a constant charging rate (achieved by imposing a voltage between the battery terminals which yields a constant current). The charging rates (typically expressed as a fraction or a multiple of C per hour) have generally ranged from about C/20 per hour up to about C/10 per hour. In addition, the total charge, Q, delivered to the batteries has generally been much larger than C, with the ratio Q/C greater than 1.6. (The batteries were heavily overcharged because it was believed that this would induce a valency increase in nickel from 2 to 4 as well as from 2 to 3, and thus the batteries would achieve capacities greater than their theoretical capacities.) Charging rates greater than about C/10 per hour (with heavy overcharging) have been avoided because such high rates lead to the liberation of undesirably large amounts of $O_2$ from within the electrolyte, a process which is exothermic. The resulting electrolyte temperature increase results in, for example, $H_2$ (in a Ni-$H_2$ battery) reacting with $NiOOH$ to form $Ni(OH)_2$ at so great a rate as to reduce the capacity of the battery.

Despite the use of heavy overcharging, none of the continuous charging techniques has proved useful in fully recharging, or even significantly increasing the reduced capacity (reduced below the theoretical capacity) of, a nickel battery which has suffered a capacity loss (typically 10 Ampere-hours for a cell where C=25 Ampere-hours) during storage. For example, while a charging rate of C/10 per hour produced a larger increase in capacity than a charging rate of C/20 per hour, this increase in capacity was typically no more than about 0.02 Ampere-hours. Moreover, repeating the charging procedure, using the same charging rate used initially, or increasing the amount of overcharge, produced little or no increase in capacity beyond that achieved initially. However, repeating the charging procedure at a higher charging rate did produce a further increase in capacity. These results have led to the belief that the only method for systematically increasing the reduced capacity (reduced below its theoretical capacity) of a nickel battery is to repeatedly charge the battery, but at a charging rate which increases with each repetition. But the undesirably large electrolyte temperature increases associated with charging rates greater than C/10 per hour have precluded the possibility of using such a procedure to fully restore nickel batteries to their theoretical capacities, or to even significantly increase the reduced capacities of nickel batteries.

Thus, those engaged in the development of nickel batteries have sought, thus far without success, a method for recovering the lost capacities of nickel batteries without requiring alteration of the battery structure.

SUMMARY OF THE INVENTION

The invention involves a new method for partially or fully restoring the lost capacities of nickel batteries (which have initially achieved capacities less than their theoretical capacities using, for example, a conventional characterization procedure or a continuous charging procedure) without alterations to the battery structures, as well as the nickel batteries produced by this method.

In accordance with the inventive method, the lost capacity of a nickel battery is partially or fully recovered by repeatedly incrementing the reduced capacity of the battery. But this is not achieved by repeatedly charging the battery at charging rates which increase with each repetition. Rather, and in contrast to previous methods, each increment in capacity is achieved by first partially or fully discharging the battery, and then charging the battery (with the amount of charge delivered to the battery being greater than the amount of charge withdrawn from the battery during the previous discharging step. Unexpectedly, each increment in capacity produced by the inventive tehcnique is approximately equal to the previous increment even if charging rates remain the same (reducing or increasing the charging rate reduces or increases the increment). Moreover, charging rates greater than C/10 per hour are used (thus achieving significantly larger increments in capacity than those achieved previously) while preventing the conversion of NiOOH to Ni(OH)$_2$, by using overcharges which are small enough to prevent the electrolyte temperature from exceeding about 30 degrees Centigrade.

BRIEF DESCRIPTION OF THE DRAWING

The invention is described with reference to accompanying FIG. 1 which is a cross-sectional view of a cell of a nickel battery.

DETAILED DESCRIPTION

Figure 1:
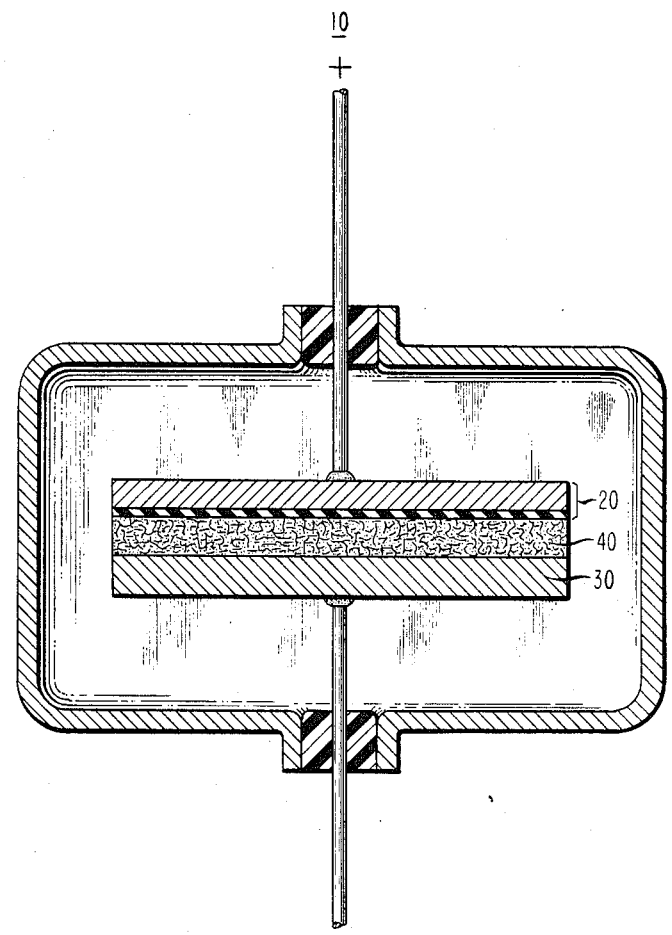

The invention involves a new method for partially or fully restoring the lost capacities of nickel batteries without alterations to the structures of the batteries, as well as the nickel batteries produced by this method.

A nickel battery formed by the inventive method includes, as shown in FIG. 1, a cell (or cells) 10 having a positive electrode 20, a negative electrode 30, and an electrolyte 40 contacted by the electrodes 20 and 30. The positive electrode 20 includes electrochemically active Ni(OH)$_2$, as well as electrically conductive material (material having a resistivity less than about 0.1 ohm-cm) such as Ni. If, for example, the battery is a Ni-H$_2$ battery, then the negative electrode 30 includes material which is electrically conductive and, preferably, which catalyzes the oxidation and reduction of H$_2$, e.g., platinum, palladium, or nickel. If, on the other hand, the battery is a Ni-Cd, Ni-Zn, or Ni-Fe battery, then the negative electrode 30 includes, respectively, Cd, Zn, and Fe.

The electrolyte contacted by the electrodes 20 and 30 includes, for example, KOH. The electrolyte often takes the form of asbestos soaked with KOH.

In accordance with the inventive method, the reduced capacity (reduced below the theoretical capacity) of a nickel battery (achieved using, for example, a conventional characterization procedure or a continuous charging procedure) is increased by first partially or fully discharging the battery, and then charging the battery. (The amount of charge delivered to the battery should be greater than the amount of charge withdrawn from the battery during the previous discharging step but small enough to prevent the electrolyte temperature from exceeding about 30 degrees Centigrade, as discussed below.) By repeating this procedure, the capacity of the battery is, unexpectedly, again increased even with no increase in charging rate or even with a reduced charging rate. In fact, if the inventive procedure is performed in a cyclical fashion, with each cycle including a discharging portion followed by a charging portion, then the incremental increase in capacity achieved by discharging and then charging a nickel battery at the end of hundreds of cycles is approximately equal to that achieved at the end of the first cycle, even if the charging rate (during the charging portion of each cycle) remains unchanged. (This is to be contrasted with prior, continuous charging techniques which achieve successive capacity increments only by repeatedly charging at charging rates which increase with each repetition. This should also be contrasted with conventional characterization procedures which produce rapidly decreasing capacity increments.)

At the beginning of the ith (i=1, 2, 3, ...) cycle, and in accordance with the invention, the reduced capacity of a nickel battery is increased by first discharging the battery to a capacity which is at least 5 percent, and preferably at least 20 percent, below the capacity attained at the end of the charging portion of the previous, i.e., (i−1)st, cycle. (On the first cycle, or if the battery is discharged and charged only once, the battery is discharged to a value which is at least 5 percent, and preferably at least 20 percent, below the initial, reduced capacity of the battery.) A discharge percentage less than about 5 percent during any cycle is undesirable because this results in an undesirably small, or no, increment in capacity during the charging portion of that cycle.

The discharge rate during any cycle is not critical. A useful discharge rate is, for example, C/2. Moreover, variable discharge rates are also useful.

Unlike previous methods, the inventive method employs charging rates (during the charging portion of any cycle) greater than C/10 per hour, while avoiding the undesirable conversion of NiOOH to Ni(OH)$_2$ (using the procedure described below). Such relatively high charging rates are desirable because they have been found to produce significantly greater increments in capacity than previously achieved. For example, at a charging rate of C/3 per hour, the capacity increase achieved at the end of a cycle is typically about 0.1 Ampere-hours, which is about 5 times greater than the largest capacity increase (0.02 Ampere-hours) achieved at the highest charging rate (C/10 per hour) used in previous (continuous charging) methods.

To achieve both an increase in capacity at the end of the ith cycle, and to prevent the counterproductive conversion of undesirably large amounts of NiOOH to Ni(OH)$_2$, two requirements should be met. The first requirement is that the ratio of the amount of charge delivered to a nickel battery during the charging portion of the ith cycle ($q_{Ci}$) to the amount of charge withdrawn from the battery during the (i−1)st cycle ($q_{Di-1}$), i.e., $q_{Ci-1}$, should be greater than 1.0. The second requirement is that $q_{Ci}/q_{Di-1}$ should be chosen, in relation to each particular charging rate, and in accordance with the invention, so that the temperature of the electrolyte does not exceed about 30 degrees Centigrade. Preferably, the battery is placed in an environment maintained at about 10 degrees Centigrade or less (e.g., a refrigerated environment), and $q_{Ci}/q_{Di-1}$ is chosen so that the electrolyte temperature does not exceed about 10 degree Centigrade. (For a fixed value of $q_{Ci}/q_{Di-1}$, electrolyte temperature increases as charging rate increases, while for a fixed charging rate, electrolyte temperature increases as $q_{Ci}/q_{Di-1}$ increases.) Generally (in contrast to previous methods which employed very heavy overcharging regardless of the charging rate), this means that the higher the charging rate, in the lower the choice of the ratio $q_{Ci}/q_{Di-1}$. If active cooling, e.g., refrigeration, is employed to maintain electrolyte temperature below 30 degrees Centigrade, then ratios of $q_{Ci}/q_{Di-1}$ larger than those employed in the absence of cooling, are useful.

It has been found that the above two requirements on $q_{Ci}/q_{Di-1}$ are met, for a wide range of charging rates, and in the absence of active cooling, if $1.01 \leq q_{Ci}/q_{Di-1} < 1.6$. For example, at a charging rate of about C/6 per hour, and at room temperature (23 degrees Centigrade), the above two requirements are met provided the ratio $q_{Ci}/q_{Di-1}$ is greater than or equal to about 1.01 but less than or equal to about 1.55, and is preferably about 1.18. At a charging rate of about C/3 per hour, and at room temperature, the ratio $q_{Ci}/q_{Di-1}$ should be greater than about 1.01 but less than or equal to about 1.5, and is preferably about 1.12. At a charging rate of about C per hour, and at room temperature, the ratio $q_{Ci}/q_{Di-1}$ should be greater than or equal to about 1.01 but less than or equal to about 1.35, and is preferably about 1.08. At a charging rate of about 2 C per hour, and at room temperature, the ratio $q_{Ci}/q_{Di-1}$ should be greater than or equal to about 1.01 but less than or equal to about 1.25, and is preferably about 1.05. Ratios of $q_{Ci}/q_{Di-1}$ greater than the above-specified limits (for each charging rate) are undesirable because (at room temperature) they produce so much heating that they result in electrolyte temperature greater than about 30 degrees Centigrade. An appropriate range of values for $q_{Ci}/q_{Di-1}$, for any particular charging rate and for any particular ambient temperature, is generally determined empirically (by monitoring electrolyte temperature during charging).

During the charging portion of the ith cycle, and in accordance with the invention, the charging rate is preferably greater than about C/10 per hour but less than about 6 C per hour, and more preferably ranges from about C/6 per hour to about 2 C per hour (while adhering to the above restrictions on $q_{Ci}/q_{Di-1}$). Charging rates less than, or equal to, about C/10 per hour, while not precluded, are less desirable because they result in undesirably small increments in capacity. Charging rates greater than about 6C per hour are undesirable they result in electrolyte temperatures greater than about 30 degrees Centigrade (in the absence of active cooling). Within the above ranges, both constant and variable charging rates are usefully employed during the charging portion of any cycle (it being understood that changes in the charging rate will likely necessitate a change in $q_{Ci}/q_{Di-1}$ to avoid electrolyte temperatures greater than about 30 degrees Centigrade).

Preferably, and in order to achieve a substantial cumulative increase in capacity, the inventive method includes at least 10 cycles. A number less than 10, while not precluded, is less desirable because this results in an undesirably small cumulative increase in the capacity of a nickel battery.

It is noteworthy that the inventive method is useful in recovering the lost capacities of nickel batteries used on the earth, and in satellites orbiting the earth. The capacities of satellite-borne nickel batteries are normally monitored (using conventional sensors and telemetry techniques), and thus a loss of capacity (occuring, for example, during a period when the battery is not in use) is readily detected. Moreover, after being used and thus discharged, these batteries are normally recharged (using conventional, continuous charging techniques) employing, for example, solar cells as the power source. During recharging, the charging rate and the overcharge are also monitored and controlled from the ground. Thus, the apparatus for applying the inventive method to satellite-borne nickel batteries already exists. (The charge removed from a nickel battery during the discharging portions of the inventive method should be dissipated. But this is readily achieved, for example, by conducting this charge through a resistor, and dissipating the charge as heat.)

EXAMPLE

The theoretical capacity, C, of a new (unused) Ni-H$_2$ battery, obtained from the Communications Satellite Corporation of America, of Clarksburg, Md., and containing electrochemically deposited Ni(OH)$_2$, was determined by weighing the Ni(OH)$_2$. Based upon this weight, the theoretical capacity was calculated to be 24 Ampere-hours.

The battery underwent a conventional characterization procedure during which it was repeatedly charged and discharged. After just 3 cycles, the battery achieved its theoretical capacity of 24 Ampere-hours.

The battery was then fully discharged, shorted (the battery terminals were connected), and stored at room temperature (23 degrees Centigrade) for 3 months. After removal from storage, a conventional characterization procedure revealed that the battery only had a capacity of 15 Ampere-hours.

In order to restore the lost capacity of the Ni-H$_2$ battery, the battery was then cycled 8 times, in an atmosphere maintained at 20 degrees Centigrade, each cycle including a discharging step and a charging step. During each discharging step, the discharge rate was about C/2 per hour. During each charging step, the charging rate was about C/5 per hour, and $q_{Ci}/q_{Di-1}$ (i=1, 2, 3, . . . , 8) was maintained at about 1.2, resulting in an electrolyte temperature of about 20 degrees Centigrade (as measured by a thermocouple). Each cycle produced a capacity increase of about 0.06 Ampere-hours (as determined from the amount of charge discharged from the battery during each discharging step).

The battery was then cycled 15 times in an atmosphere maintained at a temperature of about 6 degrees Centigrade. During each discharging step, the discharge rate was about C/2 per hour. But during each charging step, the charging rate was C/3 per hour, and $q_{C_i}/q_{D_{i-1}}$ (i=1, 2, ..., 15) was about 1.14. Each cycle produced a capacity increase of 0.1 Ampere-hours.

What is claimed is:

1. A method for making a battery which includes a nickel positive electrode, a negative electrode, and an electrolyte, said nickel positive electrode having an initial capacity less than a theoretical capacity, C, of said battery, comprising the step of cycling said battery at least 10 times, each cycle including both a discharging step during which the amount of charge withdrawn from the battery, $q_D$, is greater than or equal to about 5 percent of the capacity achieved during the previous cycle, and a charging step in which the charging rate is greater than C/10 per hour, the amount of charge delivered to said battery during said charging step, $q_C$, is greater than $q_D$ and is chosen so that a temperature of said electrolyte does not exceed about 30 degrees Centigrade.

2. The method of claim 1 wherein q is chosen so that said temperature of said electrolyte does not exceed about 10 degrees Centigrade.

3. The method of claim 1 wherein $q_D$ is greater than or equal to about 20 percent of the capacity achieved during the previous cycle.

4. The method of claim 1 wherein said charging rate is less than about 6C per hour.

5. The method of claim 1 wherein said charging rate ranges from about c/6 per hour to about 2C per hour.

6. The method of claim 1 wherein the ratio of $q_C$ to $q_D$ is greater than or equal to about 1.01 but less than about 1.6.

7. The method of claim 1 wherein said battery is a nickel-hydrogen battery.

8. The method of claim 1 wherein said battery is a nickel-cadmium battery.

9. The method of claim 1 wherein said battery is a nickel-zinc battery.

10. The method of claim 1 wherein said battery is a nickel-iron battery.

* * * * *

UNITED STATES PATENT AND TRADEMARK OFFICE
CERTIFICATE OF CORRECTION

PATENT NO. : 4,680,241
DATED : July 14, 1987
INVENTOR(S) : Christopher K. Dyer

It is certified that error appears in the above-identified patent and that said Letters Patent is hereby corrected as shown below:

Column 1, line 8, "28" should read --29--.

Column 5, line 11, "$q_{C_{i-1}}$" should read --$q_{C_i}/q_{D_{i-1}}$--.

Column 8, line 3, "q" should read --$q_C$--.

Signed and Sealed this

Thirtieth Day of January, 1990

Attest:

JEFFREY M. SAMUELS

Attesting Officer    Acting Commissioner of Patents and Trademarks